United States Patent [19]
Soderquist et al.

[11] 3,907,916
[45] Sept. 23, 1975

[54] DEHYDROGENATION OF ALKYL AROMATIC HYDROCARBONS

[75] Inventors: Frederick John Soderquist, Essexville; Theodore Thaddeus Wazbinski, Bay City; Nathan Waldman, Midland, all of Mich.

[73] Assignee: The Dow Chemical Company, Midland, Mich.

[22] Filed: Jan. 14, 1974

[21] Appl. No.: 433,033

[52] U.S. Cl. .............................. 260/669 R; 252/420
[51] Int. Cl.²....C07C 5/18; C07C 15/10; B01D 15/06
[58] Field of Search.................. 260/669 R; 252/420

[56] References Cited
UNITED STATES PATENTS
3,429,941   2/1969   Kerr et al....................... 260/669 R

*Primary Examiner*—C. Davis
*Attorney, Agent, or Firm*—Stephen Hoynak

[57] ABSTRACT

Self-regenerative dehydrogenation catalysts for converting alkyl aromatic hydrocarbons having at least 2 C atoms in at least one alkyl group are activated by short interrupted alkyl aromatic hydrocarbon feed cycles and continued steam feeding. After each such interrupted feed cycle conversion of alkyl aromatic hydrocarbons to the corresponding alkenyl aromatic derivative is increased, selectivity remains high and operations can be carried out under high severity conditions. In addition, a higher average activity level is attained and selectivity depression is eliminated or minimized.

20 Claims, No Drawings

DEHYDROGENATION OF ALKYL AROMATIC HYDROCARBONS

BACKGROUND OF THE INVENTION

Dehydrogenation of alkyl aromatic hydrocarbons, such as ethyl benzene to styrene, ethyl toluene to vinyl toluene, diethyl benzene to a mixture of divinyl benzene and vinyl ethyl benzene, isopropyl benzene to isopropenyl benzene, and ethyl naphthalene to vinyl naphthalene, by passing a mixture of steam and such alkyl aromatic hydrocarbon over a "self regenerative" catalyst is known. The self-regenerative catalysts are usually described as those containing one or more oxides of iron, zinc, chromium or magnesium, as the major ingredient, and an alkali metal oxide, hydroxide or carbonate, particularly potassium or rubidium oxides, hydroxides or carbonates, as water gas reaction promoting ingredients. This reaction tends to mitigate carbon build-up on the catalyst surface, thereby permitting long periods of continuous dehydrogenation cycles for converting alkyl aromatic hydrocarbons having at least one alkyl group of 2 to 3 C atoms to the corresponding alkenyl aromatic hydrocarbon. Representative self-regenerative catalysts are disclosed in U.S. Pat. Nos. 2,370,797, 2,395,875, 2,414,585, 2,426,829, 2,461,147, 3,205,179 and 3,703,593. These catalysts usually contain one or more of the oxides of iron, zinc, chromium or magnesium as the major ingredient and an alkali metal oxide, hydroxide or carbonate, preferably the potassium compound, as a water gas reaction promoting ingredient. The catalysts may also contain other additives such as stabilizers, binders and porosity control agents. These additives are known in the art and are described in the above cited patents.

SUMMARY OF THE INVENTION

It has been found that a self-regenerative catalyst which consists essentially of a major proportion of at least one oxide of iron, zinc, chromium or magnesium, and which also contains an amount of an alkali metal oxide, hydroxide, or carbonate, preferably the potassium compounds, to promote the water gas reaction, a chromium compound as a promoter, and, optionally, a stabilizer, binders and/or porosity control agents, can be activated by short, periodic steaming cycles (without presence of alkyl aromatic hydrocarbon). The steaming cycle of about 7–30 minutes every 24–48 hours at a temperature of from about 600°C. to about 700°C., is sufficient to activate the catalysts. Most conveniently the previous operating temperature is used for activation.

Activation of the catalyst apparently is not due to decoking, because little or no carbon oxides are found in the effluent during the activation cycle.

After activation, the conversion of alkyl aromatic hydrocarbons to alkenyl derivatives is increased, the selectivity remains high and the dehydrogenation cycle can be run under high severity conditions, e.g. low steam to hydrocarbon ratios or higher temperatures or both without excessive coking of the catalyst. It is thus possible to attain increased throughput per reactor and also to obtain higher yields of alkenyl aromatic hydrocarbon at lower reaction temperatures.

DETAILED DESCRIPTION OF THE INVENTION

The catalytic dehydrogenation of alkyl aromatic hydrocarbon having at least one alkyl group with 2 to 3 C atoms is known to be an equilibrium reaction. It is also known that as the hydrogen partial pressure in the dehydrogenation step is decreased, the ratio of styrene to ethyl benzene is increased at any given temperature. Similarly, an increase in temperature at any given partial pressure of hydrogen, also results in an increase in the styrene/ethyl benzene ratio. It is also known that as temperature increases coking is also increased at any given space velocity, and that if space velocity is reduced (reaction time increased) at any given temperature, the degree of coking increases.

In addition, the activity of the particular catalyst must be taken into consideration. An overactive catalyst tends to convert a high percentage of the alkyl benzene, but its specificity to simple dehydrogenation to alkenyl benzenes is comparatively low.

In commercial single stage adiabatic reactors the available self-regenerative catalysts have functioned satisfactorily at comparatively high steam to alkyl aromatic hydrocarbon ratios and at conversions of about 38% or slightly higher. The steam ratio will vary somewhat depending on the particular alkyl aromatic hydrocarbon undergoing dehydrogenation.

Representative alkyl aromatic hydrocarbons and ranges of steam to hydrocarbon ratios of the processes of the prior art are tabulated below.

Table 1

| Hydrocarbon | Steam/Hydrocarbon ratio |
|---|---|
| Ethylbenzene | 2.6 to 1 to 2.0 to 1 |
| Ethyltoluene | 5 to 1 to 3 to 1 |
| Diethylbenzene | 8 to 1 to 3 to 1 |
| Isopropylbenzene | 3 to 1 to 2 to 1 |

When the catalysts are activated by steaming for 7 to 30 minutes every 24–48 hours, the ratios are as follows.

Table 2

| Hydrocarbon | Steam/Hydrocarbon Ratio |
|---|---|
| Ethylbenzene | 1 to 1 to 0.4 to 1 |
| Ethyltoluene | 3 to 1 to 1.5 to 1 |
| Diethylbenzene | 6 to 1 to 1.5 to 1 |
| Isopropylbenzene | 1.5 to 1 to 0.4 to 1 |
| Ethyl naphthalene | 1.5 to 1 to .4 to 1 |
| Ethyl biphenyl | 2 to 1 to .8 to 1 |

Usually, the effect of the above defined steam activation of catalyst is not apparent if the steamhydrocarbon ratios are increased appreciably above the maximum values given in Table 2.

Although all the self-regenerative catalysts tested have responded to the activation procedure, the degree of response is not uniform for each such catalyst. In general, the greatest degree of desirable activation was found with catalysts containing approximately equal amounts by weight of ferric and zinc oxides containing from about 5 to about 30% by weight of potassium oxide, hydroxide or carbonate, from about 5 to about 10 weight percent of a copper, cadmium, thorium or silver oxides, from about 5 to 10 weight percent of alkali metal chromate, a minor amount 1 to 5 percent of a refractory type cement, and a minor amount of carbonaceous material such as methyl cellulose ethers, graphite or other ingredients defined in U.S. Pat. No. 3,205,179.

A representative catalyst made by the procedure of U.S. Pat. No. 3,205,179 contained the following.

| Ingredient | Weight Percent |
|---|---|
| $Fe_2O_3$ | 24.81 – 30.0 |
| ZnO | 24.81 – 30.0 |
| $K_2CO_3$ | 9 – 22.5 |
| $Cu_2O$ | 7.44 – 9.0 |
| $Na_2Cr_2O_7$ | 7.44 – 9.0 |
| Alumina (low silica) Cement | 3.90 |
| Methyl Cellulose | 4.00 |
| Graphite | 5.10 |

Other catalysts which are especially responsive to the activation procedure are those which are made from a mixture of hydrated (yellow) iron oxide and anhydrous (red) iron oxide in a weight ratio of 1:4 to 17:20 and about 13:7 to 4:1, respectively. These catalysts and their methods of preparation are described in U.S. Pat. No. 3,703,593. A representative catalyst had the following composition. $Fe_2O_3 + Fe_2O_3.H_2O$ 58.9%, $K_2CO_3$ 16.7%, $K_2Cr_2O_7$ 2.5%, $V_2O_5$ 2.5% methyl cellulose 8.3%, graphite 8.3%, cement 2.8%.

Other catalysts which are activated so that they perform better under high severity reaction conditions (e.g. low steam:hydrocarbon ratio or high temperature or both) include those having the following compositions.

| Component | I | II | Weight Percent III | IV | V |
|---|---|---|---|---|---|
| $Fe_2O_3$ | 74.5 | 83.0 | 87.9 | 71.9 | 62.5 |
| $Cr_2O_3$ | 2.0 | 2.2 | 2.5 | 2.3 | 2.2 |
| $K_2O$ | — | — | 9.6 | — | — |
| $K_2CO_3$ | 20.0 | 14.8 | — | 25.8 | 35.3 |
| $V_2O_5$ | 3.5 | — | — | — | — |

In brief, the invention comprises a method of activating a self-regenerative dehydrogenation catalyst by interrupting feed of alkyl aromatic hydrocarbon, and continuing feeding steam at a temperature of 600°–700°C. for a period of 7–30 minutes each 24–48 hours. Stated differently, the invention comprises a method for dehydrogenating alkyl aromatic hydrocarbons having from 1 to 2 six membered rings and from 1 to 2, two to three C atom alkyl groups and a total of eight to 14 carbon atoms, by passing a mixture of the alkyl aromatic hydrocarbon and steam over a self-regenerative catalyst, interrupting the flow of alkyl aromatic hydrocarbon for a period of 7 to 30 minutes during each 24–48 hours, but continuing the flow of steam at 600°–700°C. during the 7–30 minute period, and then resuming the flow of alkyl aromatic hydrocarbon for another 24–48 hours, and repeating the steaming and dehydrogenation cycles.

The steam to hydrocarbon ratio during the dehydrogenation cycle is within the ranges defined in Table 2 above.

All the tests reported below were run in a stainless steel tubular reactor 36 inches long, with an I.D. of 0.824 inches. The reactor was electrically heated and was equipped with metered steam and hydrocarbon feed systems, temperature controls and recovery apparatus. In each instance the reactor was loaded with 70 ml. of catalyst pellets.

The examples which follow are intended to illustrate but in no way to limit the invention.

Conversion is the percentage of the original alkyl aromatic hydrocarbon converted to the alkenyl aromatic derivative per pass. Selectivity is the percentage of the consumed alkyl aromatic hydrocarbon that resulted in the formation of a desired alkenyl aromatic derivative per pass.

EXAMPLE 1

The alkyl aromatic compound used was ethyl toluene. The steam to hydrocarbon weight ratio was 1.7 to 1. The catalyst contained 24.81 weight percent $Fe_2O_3$, 24.81% ZnO, 22.50% $K_2CO_3$, 7.44% $Cu_2O$, 7.44% $Na_2Cr_2O_7$, 3.90% alumina cement, 4.00% methyl cellulose and 5.10% graphite, before calcining. The mixture was formed into a paste with water, extruded, pelletized and dried at 110°C. The catalyst was thereafter steamed at 200° to 600°C. for 3 hours and then roasted for 6 hours at 810°–845°C.

Reaction conditions were adjusted to obtain a steady state of about 40% conversion of the ethyl toluene. The temperature ranged between 638° and 645°C. At 642°C. the conversion was 40.6 with a selectivity to vinyl toluene of 91.7%. The catalyst was then steamed for 15 minutes at 642°C. and, thereafter the ethyl toluene feed was resumed. The reaction temperature was maintained at 640°–645°C. A steaming cycle of about 15 minutes duration every 24 hours (ethyl toluene feed was cut off) was provided to activate the catalyst. Samples were taken for analysis about one-half hour before steaming and about 1½ hours after steaming. Data taken during the test are given below.

| Days | Temp. °C. | % Conv. | % Selectivity |
|---|---|---|---|
| 1 | 642 | 41.0 | 92.3 |
| 2 | 645 | 40.3 | 91.9 |
| 3 | 645 | 42.1 | 92.9 |
| 4 | 640 | 39.4 | 91.9 |
| 6 | 640 | 39.6 | 91.8 |
| 7 | 643 | 40.6 | 91.7 |
| 8 | 638 | 38.8 | 92.2 |
| 9 | 642 | 40.6 | 91.7 |
| Steam Cycle | | | |
| 9 | 642 | 47.7 | 91.5 |
| 10 | 642 | 46.9 | 91.7 |
| Steam Cycle | | | |
| 10 | 642 | 48.3 | 91.9 |
| 11 | 640 | 46.7 | 91.9 |
| Steam Cycle | | | |
| 11 | 640 | 48.4 | 92.3 |
| 13 | 640 | 46.8 | 92.0 |
| Steam Cycle | | | |
| 13 | 642 | 48.9 | 92.1 |
| 14 | 645 | 47.6 | 91.8 |
| Steam Cycle | | | |
| 14 | 645 | 49.7 | 92.0 |
| 15 | 643 | 47.7 | 91.9 |
| Steam Cycle | | | |
| 15 | 643 | 50.0 | 91.4 |
| 16 | 642 | 47.7 | 91.8 |
| Steam Cycle | | | |
| 16 | 642 | 50.1 | 92.0 |
| 17 | 642 | 48.8 | 91.9 |
| Steam Cycle | | | |
| 17 | 642 | 50.1 | 92.0 |

For comparative purposes a non self-regenerative catalyst having all the ingredients above, in the same proportions, except that $K_2CO_3$ was omitted, was tested. The catalyst was steamed for 15 minutes every 24 hours at the reaction temperature. The steam to ethyl toluene ratio was 1.7 to 1. Data taken during this test are given below.

| Days | Temp °C. | % Conv. | % Selectivity |
|---|---|---|---|
| 2 | 687 | 44.0 | 84.1 |
| 3 | 690 | 41.9 | 83.8 |
| 4 | 686 | 39.3 | 84.3 |
| 8 | 681 | 36.4 | 84.1 |
| 9 | 694 | 40.3 | 82.5 |
| Steam Cycle 9 | 696 | 40.6 | 81.8 |
| Steam Cycle 10 | 694 | 42.2 | 82.3 |
| Steam Cycle 10 | 693 | 39.3 | 81.6 |
| Steam Cycle 11 | 693 | 39.5 | 81.9 |
| Steam Cycle 11 | 695 | 39.8 | 81.3 |

From the above it is apparent that the steaming cycle had no benefit for this catalyst.

In another series of runs, the self-regenerative catalyst described above in this example was tested at a steam to ethyl toluene ratio of 3 weight parts to 1. The temperature for 40% conversion was 621°C. Thereafter the temperature was maintained at 620°–626°C. and a 15 minute steaming cycle was given to the catalyst each 24 hour period. During these tests the following data were taken.

| Days | | Temp. °C. | % Conv. | % Selectivity |
|---|---|---|---|---|
| 7 | B | 626 | | |
|   | A | 625 | 44.9 | 94.0 |
| 8 | B | 623 | 42.2 | 93.4 |
|   | A | 623 | 42.7 | 94.0 |
| 9 | B | 620 | 40.9 | 93.8 |
|   | A | 621 | 42.4 | 93.9 |
| 10 | B | 622 | 41.4 | 93.9 |
|    | A | 623 | 42.4 | 93.9 |
| 11 | B | 623 | 41.8 | 93.5 |
|    | A | 623 | 43.4 | 93.8 |
| 12 | B | 624 | 42.4 | 93.8 |
|    | A | 624 | 43.7 | 93.7 |
| 13 | B | 623 | 42.6 | 93.6 |
|    | A | 623 | 43.8 | 93.5 |
| 14 | B | 625 | 43.1 | 93.3 |
|    | A | 623 | 43.1 | 93.6 |
| 15 | B | 624 | 43.1 | 93.3 |
|    | A | 624 | 44.6 | 93.5 |

A - After steaming of catalyst
B - Before steaming

The data show that the conversion increase is perceptible but is considerably lower than that at a 1.7 to 1 steam to hydrocarbon ratio.

EXAMPLE 2

In a series of tests using the self-regenerative catalyst of Example 1 the degradation pattern of the catalyst activity after a 15 minute steaming cycle was compared with a pattern after a 1 hour steaming cycle. The data below show that a 1 hour cycle does not improve catalyst activity to any greater degree than the 15 minute cycle.

15 Minute Steaming Cycle

| Days | Temp. °C. | % Conv. | % Selectivity |
|---|---|---|---|
| 0 | 640 | 46.8 | 92.0 |
| Steam Cycle 1 | 642 | 48.9 | 92.1 |
| 2 | 642 | 49.0 | 91.6 |
| 3 | 643 | 49.8 | 91.8 |
| 4 | 643 | 49.9 | 91.5 |
| 5 | 643 | 49.8 | 91.5 |
| 6 | 644 | 50.1 | 91.4 |
| 7 | 645 | 50.4 | 91.8 |
| 8 | 645 | 50.4 | 92.0 |
| 24 | 645 | 47.6 | 91.8 |
| Steam Cycle 25.5 | 645 | 49.7 | 92.0 |

1 Hour Steaming Cycle

| Days | Temp. °C. | % Conv. | % Selectivity |
|---|---|---|---|
| 0 | 643 | 47.7 | 91.9 |
| Steam Cycle 1 | 643 | 50.0 | 91.4 |
| 2 | 643 | 49.1 | 91.7 |
| 3 | 643 | 49.2 | 91.7 |
| 4 | 643 | 50.0 | 91.7 |
| 5 | 643 | 49.9 | 91.7 |
| 6 | 643 | 50.0 | 91.7 |
| 7 | 643 | 50.2 | 91.5 |
| 23 | 642 | 47.7 | 91.9 |
| Steam Cycle 1 | 642 | 50.1 | 92.1 |

Using the same steam-ethyl toluene ratio and a 24 hour steaming cycle showed substantially no greater increase in conversion to vinyl toluene than the 15 minute cycle and selectivity had decreased slightly. A 24 hour steaming cycle, however, increases the negative effect of by-product formation.

EXAMPLE 3

In this series, the catalyst was brought to steady state of about 40% conversion, using a steam-ethyl toluene ratio of 1.7 to 1. The temperature was 641°–648°C. Thereafter the catalyst was subjected to 15 minute steaming cycles each 24 hours for 21 days and then to 7 minute steaming cycles each 24 hours for 8 days. It was found that a 40% conversion level could be maintained at temperatures considerably lower than 640°C. and about a 2% higher selectivity was realized. Data taken during these tests are tabulated below.

| Days | Temp. °C. | % Conv. | % Selectivity |
|---|---|---|---|
| 6 | 648 | 39.9 | 91.0 |
| 7 | 646 | 39.2 | 91.8 |
| 11 | 641 | 38.8 | 92.0 |
| 12 | 643 | 39.3 | 92.0 |
| 13 | 647 | 41.3 | 92.0 |
| 14 | 647 | 41.7 | 91.8 |
| 17 | 642 | 37.0 | 92.1 |
| Steam Cycle (15 min.) 18 | 629 | 43.1 | 93.7 |
| Steam Cycle 19 | 628 | 43.1 | 94.0 |
| Steam Cycle 20 | 623 | 39.8 | 94.2 |
| Steam Cycle 21 | 622 | 38.9 | 94.8 |
| Steam Cycle 24 | 621 | 36.9 | 94.6 |
| Steam Cycle 25 | 629 | 42.2 | 93.6 |
| Steam Cycle 27 | 630 | 42.2 | 94.4 |
| Steam Cycle 28 | 625 | 38.7 | 94.1 |
| Steam Cycle 31 | 626 | 40.5 | 94.3 |
| Steam Cycle | | | |

| Days | Temp. °C. | % Conv. | % Selectivity |
|---|---|---|---|
| 32 | 627 | 40.8 | 94.2 |
| Steam Cycle | | | |
| 33 | 627 | 40.9 | 93.4 |
| Steam Cycle | | | |
| 34 | 628 | 40.7 | 93.9 |
| Steam Cycle | | | |
| 35 | 628 | 41.6 | 94.3 |
| Steam Cycle | | | |
| 38 | 627 | 39.5 | 94.3 |
| Steam Cycle | | | |
| 39 | 625 | 39.7 | 94.4 |
| Steam Cycle | | | |
| 40 | 627 | 42.3 | 93.6 |
| 41 | 626 | 41.1 | 93.8 |
| Steam Cycle (7 min.) | | | |
| 43 | 628 | 42.7 | 93.6 |
| Steam Cycle | | | |
| 44 | 628 | 42.5 | 94.3 |
| Steam Cycle | | | |
| 45 | 628 | 41.9 | 94.2 |
| Steam Cycle | | | |
| 46 | 628 | 42.1 | 93.9 |
| Steam Cycle | | | |
| 47 | 628 | 42.2 | 94.1 |
| Steam Cycle | | | |
| 48 | 626 | 40.9 | 94.4 |
| Steam Cycle | | | |
| 49 | 628 | 41.0 | 94.1 |

EXAMPLE 4

Ethyl benzene was dehydrogenated to styrene by the procedure described in Example 1 using a catalyst containing 87.9 weight percent $Fe_2O_3$, 2.5% $Cr_2O_3$ and 9.0% $K_2O$. When a steam to hydrocarbon ratio of 1 to 1 or higher was fed to the reactor, at temperatures of 590° to about 600°C., with 15 minutes steaming cycles each 24 hours, there was a perceptible change in conversion but no change if steamethyl benzene ratios greater than 1 to 1 were used. However, when the severity was increased by lowering the steam to ethyl benzene ratio 0.70.7 to 1 or as low as 0.4to 1 and temperature was increased considerably, the activation effect of 15 minute steaming cycles each 24 hours was readily apparent. Tabulated below are data taken at 0.7, 0.5 and 0.4 parts of steam per part of hydrocarbon.

Steam - Ethyl Benzene Ratio 0.7 to 1

| Days | Temp. °C. | % Conv. | % Selectivity |
|---|---|---|---|
| 36 | 628 | 37.2 | 89.6 |
| Steam Cycle | | | |
| 36 | 628 | 40.0 | 91.4 |
| 37 | 631 | 38.5 | 92.0 |
| Steam Cycle | | | |
| 37 | 630 | 42.7 | 91.6 |
| 39 | 629 | 38.1 | 90.9 |
| Steam Cycle | | | |
| 39 | 630 | 42.6 | 90.3 |
| 40 | 629 | 39.1 | 91.6 |
| Steam Cycle | | | |
| 40 | 630 | 44.9 | 91.1 |
| 41 | 631 | 38.7 | 90.7 |
| Steam Cycle | | | |
| 41 | 632 | 47.0 | 91.0 |
| 42 | 630 | 39.1 | 91.1 |
| Steam Cycle | | | |
| 42 | 631 | 46.4 | 90.3 |
| 43 | 631 | 39.4 | 90.7 |
| Steam Cycle | | | |
| 43 | 629 | 43.6 | 91.2 |
| 44 | 631 | 40.2 | — |
| Steam Cycle | | | |
| 44 | 631 | 45.4 | — |

Steam - Ethyl Benzene Ratio 0.7 to 1

| Days | Temp. °C. | % Conv. | % Selectivity |
|---|---|---|---|
| 45 | 628 | 39.6 | — |
| Steam Cycle | | | |
| 45 | 628 | 45.4 | — |
| 46 | 627 | 38.3 | 91.0 |
| Steam Cycle | | | |
| 46 | 627 | 41.6 | — |
| 47 | 627 | 38.5 | — |
| Steam Cycle | | | |
| 47 | 626 | 46.8 | — |
| 1 | 652 | 36.7 | 87.5 |
| 2 | 654 | 34.6 | 85.4 |
| 3 | 662 | 33.1 | 83.4 |
| 3 | 666 | 34.5 | 84.9 |
| 6 | 669 | 31.8 | 83.3 |
| 6 | 668 | 31.5 | 84.4 |
| Steam Cycle | | | |
| 6 | 667 | 40.0 | 85.6 |
| 7 | 667 | 31.9 | 83.3 |
| Steam Cycle | | | |
| 7 | 667 | 40.0 | 85.7 |
| 8 | 668 | 31.5 | 84.3 |
| Steam Cycle | | | |
| 8 | 668 | 39.2 | 83.1 |
| 9 | 668 | 32.3 | 84.6 |
| Steam Cycle | | | |
| 9 | 668 | 39.8 | 86.1 |
| 10 | 668 | 31.4 | 83.1 |
| Steam Cycle | | | |
| 10 | 668 | 39.4 | 85.2 |
| 12 | 667 | 30.5 | 84.1 |
| Steam Cycle | | | |
| 14 | 667 | 42.8 | 87.7 |
| 15 | 667 | 33.8 | 85.6 |
| Steam Cycle | | | |
| 15 | 667 | 42.0 | 87.0 |
| 16 | 667 | 32.7 | 85.6 |
| Steam Cycle | | | |
| 16 | 667 | 45.4 | 87.4 |
| 6 | 680 | 30.3 | 75.7 |
| Steam Cycle | | | |
| 6 | 681 | 38.0 | 79.9 |
| 7 | 682 | 30.6 | 75.9 |
| Steam Cycle | | | |
| 7 | 682 | 38.6 | 79.9 |
| 11 | 681 | 35.1 | 77.2 |
| Steam Cycle | | | |
| 11 | 681 | 40.1 | 80.7 |
| 12 | 681 | 33.8 | 77.8 |
| Steam Cycle | | | |
| 12 | 681 | 45.9 | 82.1 |
| 13 | 681 | 33.7 | 78.3 |
| Steam Cycle | | | |
| 13 | 681 | 43.7 | 82.1 |
| 14 | 681 | 33.1 | 78.0 |
| Steam Cycle | | | |
| 14 | 681 | 45.9 | 83.5 |
| 15 | 682 | 32.8 | 78.3 |
| Steam Cycle | | | |
| 15 | 682 | 43.8 | 83.0 |
| 17 | 680 | 36.7 | 79.6 |
| Steam Cycle | | | |
| 17 | 680 | 46.9 | 83.3 |
| 18 | 680 | 34.7 | 77.8 |
| Steam Cycle | | | |
| 18 | 681 | 43.7 | 80.4 |

Similar results are obtained with a catalyst analyzing 74.5 weight percent $Fe_2O_3$, 2.0% $Cr_2O_3$, 20.0% $K_2CO_3$, and 3.5% $V_2O_5$. Tests were run with this catalyst to determine whether excess coking of catalyst at the end of a 24 hour period at 630°C. and a steam to ethyl benzene ratio of 1 to 1 caused the lower activity. During a 15 minute steam cycle the noncondensible vent gases were collected and analyzed. The carbon content of the catalyst ranged from 2.2 to 2.5 weight percent. This compares with a typical range of 2.4 to 2.6% carbon on a catalyst during low severity operations e.g. 3 to 1 steam to ethyl benzene ratio and a temperature of about 590°C. These tests show that excessive coking is not the cause of lowering catalyst activity.

EXAMPLE 5

The procedure described for Example 1 was followed in these tests. The catalyst however, contained 62.5 weight percent $Fe_2O_3$, 2.2% $Cr_2O_3$ and 35.3% $K_2CO_3$. Tabulated below are the data obtained during dehydrogenation of ethyl benzene.

Steam - Ethyl Benzene Ratio 0.7 to 1

| Days | Temp. °C. | % Conv. | % Selectivity |
|---|---|---|---|
| 28 | 606 | 39.3 | 92.9 |
| Steam Cycle | | | |
| 28 | 607 | 42.1 | 93.1 |
| 29 | 609 | 40.7 | 93.0 |
| Steam Cycle | | | |
| 29 | 610 | 43.9 | 92.9 |
| 32 | 607 | 41.7 | 93.1 |
| Steam Cycle | | | |
| 32 | 609 | 45.7 | 92.9 |
| 33 | 608 | 42.1 | 93.1 |
| Steam Cycle | | | |
| 33 | 610 | 45.0 | 93.1 |
| 34 | 614 | 43.5 | 92.5 |
| Steam Cycle | | | |
| 34 | 617 | 49.4 | 93.2 |
| 35 | 616 | 44.7 | 92.6 |
| Steam Cycle | | | |
| 35 | 616 | 48.9 | 92.0 |
| 36 | 617 | 44.9 | 92.4 |
| Steam Cycle | | | |
| 36 | 617 | 48.7 | 91.5 |
| 39 | 613 | 44.0 | 93.0 |
| Steam Cycle | | | |
| 39 | 615 | 47.4 | 92.4 |

EXAMPLE 6

In these tests a catalyst containing 23.6% $Fe_2O_3 \cdot H_2O$, 35.3% $Fe_2O_3$, 16.7% $K_2CO_3$, 2.5% $K_2Cr_2O_7$, 2.5% $V_2O_5$, 2.8% cement, 8.3% methyl cellulose and 8.3% graphite was used.

The steam to ethyl benzene ratio was 1 to 1.

Data obtained during the test are tabulated below.

| Days | | Temp. °C. | % Conv. | % Selectivity |
|---|---|---|---|---|
| 25 | | 649 | 39.4 | 94.3 |
| 26 | B | 649 | 39.1 | 94.4 |
| 26 | A | 649 | 59.4 | 95.0 |
| 27 | B | 649 | 49.6 | 95.0 |
| 27 | A | 649 | 60.6 | 95.0 |
| 28 | B | 648 | 48.2 | 94.8 |
| 30 | B | 647 | 51.8 | 95.8 |
| 30 | A | 647 | 60.3 | 95.5 |
| 31 | B | 647 | 50.5 | 94.4 |
| 31 | A | 647 | 60.6 | 96.0 |
| 32 | B | 647 | 47.4 | 94.9 |
| 32 | A | 646 | 59.8 | 95.4 |
| 33 | B | 646 | 50.7 | 95.2 |
| 33 | A | 646 | 59.9 | 95.1 |
| 34 | B | 646 | 50.0 | — |
| 34 | A | 646 | 59.3 | — |
| 35 | B | 646 | 51.0 | — |
| 35 | A | 646 | 59.4 | — |
| 36 | B | 646 | 52.1 | 95.2 |
| 36 | A | 646 | 60.5 | — |
| 37 | B | 646 | 50.9 | — |

A = after steaming
B = before steaming

EXAMPLE 7

Isopropyl benzene was dehydrogenated to alpha methyl styrene with the catalyst described in Example 1. The procedure used was similar to that described above, in that, after attaining about 40% conversion, the steaming cycle of about 15 minutes each 24 hours was begun. Data taken during the tests are tabulated below.

Steam - Isopropyl Benzene Ratio 1 to 1

| Days | Temp. °C. | % Conv. | % Selectivity |
|---|---|---|---|
| 32 | 620 | 41.6 | 96.6 |
| Steam Cycle | | | |
| 32 | 619 | 51.8 | 97.4 |
| 33 | 619 | 40.2 | 97.4 |
| Steam Cycle | | | |
| 33 | 619 | 51.8 | 97.4 |
| 34 | 621 | 40.6 | 96.2 |
| Steam Cycle | | | |
| 34 | 621 | 56.0 | 97.7 |
| 35 | 621 | 39.5 | 97.4 |
| Steam Cycle | | | |
| 35 | 621 | 51.4 | 98.0 |
| 38 | 625 | 42.0 | 96.0 |
| Steam Cycle | | | |
| 38 | 623 | 57.5 | 97.4 |
| 39 | 623 | 42.9 | 95.3 |
| Steam Cycle | | | |
| 39 | 620 | 58.1 | 97.5 |
| 40 | 620 | 40.2 | 95.9 |
| Steam Cycle | | | |
| 40 | 619 | 59.7 | 97.5 |
| 41 | 624 | 40.4 | 95.8 |
| Steam Cycle | | | |
| 41 | 625 | 59.9 | 97.3 |
| 45 | 622 | 38.5 | 95.5 |
| Steam Cycle | | | |
| 45 | 619 | 54.0 | 97.5 |
| 46 | 618 | 37.3 | 96.0 |
| Steam Cycle | | | |
| 46 | 618 | 43.9 | 96.9 |
| 47 | 617 | 35.7 | 96.6 |
| Steam Cycle | | | |
| 47 | 622 | 45.6 | 98.6 |

When tests were run at a steam to isopropyl benzene ratio of 2 to 1 at 586°–596°C., the activation of catalyst was perceptible, but not of the magnitude shown at the 1 to 1 ratio.

EXAMPLE 8

The catalyst described in Example 4 was used to dehydrogenate diethyl benzene (DEB). A mixture of ethyl vinyl benzene (EVB) and divinyl benzene (DVB) was produced. At a steam to hydrocarbon ratio of 6 to 1 the improvement in catalyst activity is perceptible, but not as great as that obtained at a ratio of 3 to 1. Tabulated below are data obtained while dehydrogenating diethyl benzene at a steam to hydrocarbon ratio of 3 to 1. The steam cycle was of 15 minutes duration each 24 hours.

| | | Crude Product Anal. | | | |
|---|---|---|---|---|---|
| Temp. °C. | | % DEB. | % EVB. | % DVB. | EVB. + DVB. |
| 645 | B | 44.1 | 26.3 | 23.3 | 49.6 |
| 645 | A | 35.6 | 28.1 | 28.1 | 56.2 |
| 645 | B | 46.5 | 24.7 | 22.9 | 47.6 |
| 644 | A | 36.0 | 27.6 | 28.1 | 55.7 |
| 644 | B | 44.8 | 26.7 | 22.8 | 49.5 |
| 644 | A | 36.2 | 27.7 | 27.5 | 55.2 |
| 644 | B | 45.7 | 26.2 | 22.1 | 48.3 |
| 643 | A | 36.2 | 27.4 | 27.2 | 54.6 |
| 644 | B | 45.3 | 26.6 | 22.5 | 49.1 |
| 643 | A | 36.0 | 27.9 | 29.5 | 57.4 |

A = after steaming
B = before steaming

These data show that the major increase was in the amount of divinyl benzene produced.

The conversion of ethyl naphthalene to vinyl naphthalene or ethyl biphenyl to vinyl biphenyl can be effected with the self-regenerative catalysts recited above. The dehydrogenation of the alkyl bicyclic compounds takes place under about the same conditions as those used for dehydrogenating the alkyl monocyclic hydrocarbons with comparable conversions and selectivities for the dehydrogenation of ethyl naphthalene. However, when ethyl biphenyl is the hydrocarbon undergoing dehydrogenation, the conversion and selectivity is generally slightly lower than those for ethyl naphthalene at identical operating conditions.

All the runs above were made at a liquid hourly space velocity of about 0.5. However, the space velocity can range from about 0.1 to about 1. In a large scale test for converting ethyl toluene to vinyl toluene a 3 to 1 steam to ethyl toluene, a liquid hourly space velocity of 0.3 and a temperature of 620°–640°C., with 15 minute steaming cycles each 24 hours, was found to improve conversions and selectivities of about the same magnitude as shown in the examples.

The process of this invention is applicable to adiabatic or heated case reactor procedures. The catalyst can be a fixed bed, either radial or packed, or a fluidized bed. In addition the process is applicable to single or multi reactor systems, especially those multi reactor systems in which interstage steam injection is possible, although multi reactor systems with provision for indirect heat exchange between stages is also operable.

We claim:

1. In a method of activating self-regenerative dehydrogenation catalysts useful for dehydrogenating alkyl aromatic hydrocarbons having from 1 to 2 six membered rings and from 1 to 2 alkyl groups of 2–3 C atoms to the corresponding alkenyl aromatic hydrocarbon, by passing a mixture of steam and said alkyl aromatic hydrocarbon over said catalyst at a temperature of from about 600° to about 700°C., the improvement comprising interrupting the feed of the said alkyl aromatic hydrocarbon and continuing the feed of steam at the said temperature for a period of 7–30 minutes each 24–48 hours with little or no carbon oxide effluence during the activation cycle to provide a catalyst activation cycle, resuming the feed of said alkyl aromatic hydrocarbon for dehydrogenation thereof under high severity reaction conditions, and repeating said activation cycles and said alkyl aromatic hydrocarbon dehydrogenation cycles.

2. The method of claim 1 in which the catalyst has a weight ratio of hydrated iron oxide and anhydrous iron oxide of 1:4 to 17:20 and about 13:7 to 4:1, respectively.

3. The method of claim 1 in which the catalyst contains from about 62.5 to about 87.9% by weight of $Fe_2O_3$, from about 2 to about 2.5% by weight of $Cr_2O_3$ and from about 9.6 to about 35.3% by weight of at least one of $K_2O$ or $K_2CO_3$.

4. The method of claim 3 in which the catalyst contains about 3.5% by weight of $V_2O_5$.

5. The method of claim 1 in which the catalyst contains from about 24.8 to 30% by weight each of $Fe_2O_3$ and ZnO, from about 5 to about 30% by weight of potassium oxide, hydroxide or carbonate, from about 5 to about 10% by weight of an oxide of copper, cadmium, thorium or silver, from about 5 to about 10% by weight of an alkali metal chromate, from about 1 to about 5% by weight of a refractory cement and a small amount of a carbonaceous material.

6. In a method of dehydrogenating an alkyl aromatic hydrocarbon having from 1 to 2 six membered rings and from 1 to 2 alkyl groups of from 2 to 3 C atoms each and a total of 8 to 14 C atoms in said hydrocarbon, in the presence of steam, at a temperature of from about 600° to about 700°C., by passing a mixture of the steam and said hydrocarbon over a self-regenerative catalyst, the improvement comprising, interrupting the flow of the alkyl aromatic hydrocarbon while continuing the flow of steam at the said temperature for a period of from 7 to about 30 minutes during each 24–48 hours, then resuming the flow of alkyl aromatic hydrocarbon and repeating the steps of interrupting the flow of said alkyl aromatic hydrocarbon and continuing the flow of steam for said 7–30 minutes each 24–48 hours.

7. The method of claim 6 in which the alkyl aromatic hydrocarbon is ethyl toluene, and the feed during dehydrogenation contains from 1.5 to 3 parts by weight of steam per part of said hydrocarbon.

8. The method of claim 7 in which the steam to hydrocarbon ratio is 1.7 to 1.

9. The method of claim 7 in which the steam to hydrocarbon ratio is 3 to 1, the dehydrogenation temperature is 620°–640°C., the liquid hourly space velocity is about 0.3, the steaming period is of about 15 minutes duration each 24 hours, and the catalyst contains 24.81% by weight of $Fe_2O_3$, 24.1% of ZnO, 22.5% $K_2CO_3$, 7.44% $Cu_2O$, 7.44% $Na_2Cr_2O_7$ 3.9% alumina cement, 4% methyl cellulose and 5.1% graphite before calcining.

10. The method of claim 6 in which the alkyl aromatic hydrocarbon is ethyl benzene and feed during dehydrogenation contains 0.4 to 1 part of steam per part of hydrocarbon.

11. The method of claim 6 in which the alkyl aromatic hydrocarbon is diethyl benzene and the feed during dehydrogenation contains from 1.5 to 6 parts of steam per part of hydrocarbon.

12. The method of claim 6 in which the alkyl aromatic hydrocarbon is isopropyl benzene and the feed during the dehydrogenation step contains 0.4 to 1.5 parts of steam per part of hydrocarbon.

13. The method of claim 6 in which the alkyl aromatic hydrocarbon is ethyl biphenyl and the feed during the dehydrogenation step contains from 0.8 to 2 parts of steam per part of hydrocarbon.

14. The method of claim 6 in which temperature during the catalyst steaming step is about the same as the dehydrogenation temperature.

15. The method of claim 10 in which the catalyst contains 87.9% by weight of $Fe_2O_3$, 2.5% $Cr_2O_3$ and 9.0% $K_2O$.

16. The method of claim 10 in which the catalyst contains 74.5% by weight of $Fe_2O_3$, 2.0% $Cr_2O_3$, 20.0% $K_2CO_3$ and 3.5% $V_2O_5$.

17. The method of claim 10 in which the catalyst contains 62.5% by weight of $Fe_2O_3$, 2.2% $Cr_2O_3$, and 35.3% $K_2CO_3$.

18. The method of claim 10 in which the catalyst contains 23.6% by weight of ferric oxide hydrate, 35.3% anhydrous ferric oxide, 16.7% $K_2CO_3$, 2.5% $K_2Cr_2O_7$, 2.5% $V_2O_5$, 2.8% cement, 8.3% methyl cellulose, and 8.3% graphite.

19. The method of claim 12 in which the catalyst contains 24.81% by weight of $Fe_2O_3$, 24.81% ZnO, 22.5% $K_2CO_3$, 7.44% $Cu_2O$, 7.44% $Na_2Cr_2O_7$, 3.9% alumina cement, 4% methyl cellulose and 5.1% graphite before calcining.

20. The method of claim 11 in which the catalyst contains 87.9% by weight of $Fe_2O_3$, 2.5% $Cr_2O_3$ and 9.0% $K_2O$.

* * * * *

UNITED STATES PATENT AND TRADEMARK OFFICE
CERTIFICATE OF CORRECTION

PATENT NO. : 3,907,916

DATED : September 23, 1975

INVENTOR(S) : F. J. Soderquist; T. T. Wazbinski; N. Waldman

It is certified that error appears in the above–identified patent and that said Letters Patent are hereby corrected as shown below:

Col. 8, approximately line 12, after

"Steam Cycle
47          626          46.8          –"  insert the heading:

-- 
Steam to Ethyl Benzene Ratio 0.5 to 1
Days  Temp. °C.  % Conv.  % Selectivity --

Col. 8, approximately line 33, after

"Steam Cycle
16          667          45.4          87.4"  insert the heading:

--
Steam – Ethyl Benzene Ratio 0.4 to 1
Days  Temp. °C.  % Conv.  % Selectivity --

Signed and Sealed this

*third* Day of *February 1976*

[SEAL]

*Attest:*

RUTH C. MASON
*Attesting Officer*

C. MARSHALL DANN
*Commissioner of Patents and Trademarks*